United States Patent
Yamamoto

(10) Patent No.: US 8,524,129 B2
(45) Date of Patent: Sep. 3, 2013

(54) METHOD FOR PRODUCING A FUEL CELL SEPARATOR

(75) Inventor: Kazuhiro Yamamoto, Minato-ku (JP)

(73) Assignee: Tokai Carbon Co., Ltd., Tokyo (JP)

( * ) Notice: Subject to any disclaimer, the term of this patent is extended or adjusted under 35 U.S.C. 154(b) by 34 days.

(21) Appl. No.: 13/381,447

(22) PCT Filed: May 27, 2010

(86) PCT No.: PCT/JP2010/058966
§ 371 (c)(1),
(2), (4) Date: Mar. 9, 2012

(87) PCT Pub. No.: WO2011/001766
PCT Pub. Date: Jan. 6, 2011

(65) Prior Publication Data
US 2012/0161352 A1    Jun. 28, 2012

(30) Foreign Application Priority Data
Jun. 29, 2009    (JP) ................. 2009-153688

(51) Int. Cl.
*B29C 43/20*    (2006.01)
*H01M 2/14*    (2006.01)

(52) U.S. Cl.
USPC ............. 264/112; 264/113; 264/120

(58) Field of Classification Search
None
See application file for complete search history.

(56) References Cited

U.S. PATENT DOCUMENTS

| | | | |
|---|---|---|---|
| 7,125,624 B2 * | 10/2006 | Tanno | 429/508 |
| 2002/0180088 A1 * | 12/2002 | Hashiguchi et al. | 264/102 |
| 2004/0028959 A1 * | 2/2004 | Horiuchi et al. | 429/12 |
| 2009/0214926 A1 | 8/2009 | Watanabe et al. | |

FOREIGN PATENT DOCUMENTS

| | | |
|---|---|---|
| JP | 1-197968 A | 8/1988 |
| JP | 8-130024 A | 5/1996 |
| JP | 2005-203296 A | 7/2005 |
| JP | 2006-216257 A | 8/2006 |
| JP | 2007-172957 A | 7/2007 |
| WO | 2006/135108 A1 | 12/2006 |

OTHER PUBLICATIONS

International Search Report of PCT/JP2010/058966, mailing date Aug. 3, 2010.

* cited by examiner

*Primary Examiner* — Mary F Theisen
(74) *Attorney, Agent, or Firm* — Westerman, Hattori, Daniels & Adrian, LLP

(57) ABSTRACT

A method of producing a fuel cell separator includes pressing a compact part-forming material that includes a carbonaceous powder and a thermosetting resin binder at a temperature equal to or higher than the softening temperature of the thermosetting resin binder and less than the curing temperature of the thermosetting resin binder to obtain a compact part-forming preformed sheet, preparing a porous part-forming powder that includes a carbonaceous powder and a thermosetting resin binder, placing the compact part-forming preformed sheet and the porous part-forming powder in a forming die that has a concave-convex forming surface corresponding to the shape of a gas passage so that the concave-convex forming surface faces the porous part-forming powder, and hot-pressing the compact part-forming preformed sheet and the porous part-forming powder using the forming die at a temperature equal to or higher than the curing temperature of the thermosetting resin binder included in the compact part-forming material or the curing temperature of the thermosetting resin binder included in the porous part-forming powder, whichever is the higher.

3 Claims, 3 Drawing Sheets

(a)

(b)

(c)

METHOD FOR PRODUCING A FUEL CELL SEPARATOR

TECHNICAL FIELD

The invention relates to a method of producing a fuel cell separator.

BACKGROUND ART

A fuel cell directly converts the chemical energy of fuel into electrical energy with a high conversion efficiency, and produces noise and vibrations to only a small extent. Therefore, the fuel cell is expected to be a power supply in various fields such as portable instruments, automobiles, trains, and cogeneration.

A polymer electrolyte fuel cell includes a stack formed by stacking several tens to several hundreds of cells, each of the cells having a structure in which an anode and a cathode that support a catalyst (e.g., platinum) are disposed on either side of an ion-conductive polymer membrane (ion-exchange membrane), and plate-like separators are disposed on the outer side of the anode and the outer side of the cathode. The polymer electrolyte fuel cell may utilize a ribbed electrode configuration in which grooves that serve as flow passages for a fuel gas (e.g., hydrogen) and an oxidant gas (e.g., air) are formed in the surface of each electrode that faces the separator, or a ribbed separator configuration in which such grooves are formed in the surface of each separator (see Patent Document 1, for example).

The plate-like separator is required to exhibit high gas impermeability in order to completely separately supply the fuel gas and the oxidant gas to the electrodes. The plate-like separator is also required to exhibit high conductivity in order to reduce the internal resistance of the cell and increase the electricity generation efficiency. Since the stack must be strongly fastened during assembly so that the single cells adhere closely, high strength is desired for the separator material. When a fuel cell is provided in an automobile, cracking or breakage may occur due to vibrations, impact, expansion/contraction caused by a change in temperature, or the like. Therefore, the separator material is required to exhibit properties that suppress such cracking or breakage.

A carbonaceous material has been used for the separator for which the above properties are required. A carbon/cured resin formed body produced by integrally binding a carbon powder (e.g., graphite) using a thermosetting resin as a binder has been suitably used as the separator material.

A fuel cell separator has a drawback in which the groove (gas passage) may be clogged by water produced during electricity generation. In order to eliminate the above drawback, short fibers that exhibit water repellency may be provided on the surface of the groove (gas passage) (see Patent Document 2, for example), or the surface of the groove (gas passage) may be hydrophilized, for example. However, a post-treatment may be required when using the hydrophilization treatment, or the cell performance may deteriorate due to an increase in contact resistance of the separator when using the above method.

RELATED-ART DOCUMENT

Patent Document

Patent Document 1: JP-A-2007-172957
Patent Document 2: JP-A-8-130024

SUMMARY OF THE INVENTION

Problems to be Solved by the Invention

In view of the above situation, an object of the invention is to provide a method of producing a fuel cell separator that suppresses a situation in which the flow passage is clogged by water produced during electricity generation, suppresses a decrease in electricity generation efficiency and an increase in contact resistance, and exhibits excellent strength and gas impermeability.

Means for Solving the Problems

The inventor of the invention conducted extensive studies in order to achieve the above object. As a result, the inventor found that a fuel cell separator that includes a porous part and a compact part, and is configured so that at least part of the wall surface of the gas passage is formed by the porous part, suppresses a situation in which the flow passage is clogged by water since water produced during electricity generation can be diffused by the porous part, and a decrease in strength and gas impermeability due to the porous part can be compensated for by the compact part as a result of forming the compact part together with the porous part.

However, when forming a compact part-forming raw material and a porous part-forming raw material into a separator using a single die, it is necessary to increase the forming pressure, or increase the amount of resin used as the compact part-forming raw material so that the compact part exhibits gas impermeability. It was found that the porosity of the porous part of the resulting separator may decrease when increasing the forming pressure, so that water produced during electricity generation may not be sufficiently diffused. It was also found that an increase in resistance may occur due to an increase in internal resistance when increasing the amount of resin used as the compact part-forming raw material, so that the electricity generation efficiency may decrease.

The compact part-forming raw material and the porous part-forming raw material may be separately compression-formed, thermally cured, and then hot-pressed in a die. In this case, since the porous part and the compact part of the resulting separator are not sufficiently bonded (i.e., the bonding strength is low), the contact resistance between the porous part and the compact part may increase.

The inventor conducted further studies, and found that the above object can be achieved by producing a fuel cell separator using a method that includes pressing a compact part-forming material that includes a compact part-forming carbonaceous powder and a compact part-forming thermosetting resin binder at a temperature equal to or higher than the softening temperature of the compact part-forming thermosetting resin binder and less than the curing temperature of the compact part-forming thermosetting resin binder to obtain a compact part-forming preformed sheet, preparing a porous part-forming powder that includes a porous part-forming carbonaceous powder and a porous part-forming thermosetting resin binder, placing the compact part-forming preformed sheet and the porous part-forming powder in a forming die that has a concave-convex forming surface corresponding to the shape of the gas passage so that the concave-convex forming surface faces the porous part-forming powder, and hot-pressing the compact part-forming preformed sheet and the porous part-forming powder using the forming die at a temperature equal to or higher than the curing temperature of the compact part-forming thermosetting resin binder or the curing temperature of the porous part-forming thermosetting resin binder, whichever is the higher. This finding has led to the completion of the invention.

Specifically, the invention provides (1) a method of producing a fuel cell separator that includes a porous part and a compact part, at least part of a wall surface of a gas passage being formed by the porous part, the method including pressing a compact part-forming material that includes a compact part-fanning carbonaceous powder and a compact part-forming thermosetting resin binder at a temperature equal to or higher than the softening temperature of the compact part-forming thermosetting resin binder and less than the curing temperature of the compact part-forming thermosetting resin binder to obtain a compact part-forming preformed sheet, preparing a porous part-forming powder that includes a porous part-forming carbonaceous powder and a porous part-forming thermosetting resin binder, placing the compact part-forming preformed sheet and the porous part-forming powder in a forming die that has a concave-convex forming surface corresponding to the shape of the gas passage so that the concave-convex forming surface faces the porous part-forming powder, and hot-pressing the compact part-forming preformed sheet and the porous part-forming powder using the forming die at a temperature equal to or higher than the curing temperature of the compact part-forming thermosetting resin binder or the curing temperature of the porous part-forming thermosetting resin binder, whichever is the higher, (2) the method of producing a fuel cell separator according to (1), wherein the compact part-forming material is pressed under a pressure of 20 to 100 MPa, (3) the method of producing a fuel cell separator according to (1) or (2), wherein the porous part-forming carbonaceous powder has a volume average particle size of 50 to 500 μm, (4) the method of producing a fuel cell separator according to any one of (1) to (3), wherein the compact part-forming preformed sheet and the porous part-forming powder are hot-pressed under a pressure of 1 MPa or more and less than 20 MPa, and (5) the method of producing a fuel cell separator according to (1), further including hydrophilizing a product obtained by the hot-pressing.

Effects of the Invention

According to the invention, since at least part of the wall surface of the gas passage of the fuel cell separator is formed by the porous part, water produced during electricity generation can be easily diffused (i.e., clogging of the gas passage is suppressed), so that a decrease in electricity generation efficiency can be suppressed. Moreover, an increase in contact resistance can also be suppressed. Since the fuel cell separator includes the compact part in addition to the porous part, excellent strength and gas impermeability can be obtained. Since the compact part-forming material that includes the compact part-forming thermosetting resin binder is pressed at a temperature equal to or higher than the softening temperature of the compact part-forming thermosetting resin binder and less than the curing temperature of the compact part-forming thermosetting resin binder to obtain a compact part-forming preformed sheet, the compact part of the separator can be provided with the desired strength and gas impermeability. Since the compact part-forming preformed sheet and the porous part-forming powder are hot-pressed using the forming die at a temperature equal to or higher than the curing temperature of the compact part-forming thermosetting resin binder or the curing temperature of the porous part-forming thermosetting resin binder, whichever is the higher, to obtain a fuel cell separator, the porous part and the compact part can be strongly bonded (i.e., an increase in contact resistance can be suppressed) while suppressing a decrease in porosity of the porous part.

DESCRIPTION OF EXEMPLARY EMBODIMENTS

Figure 1:
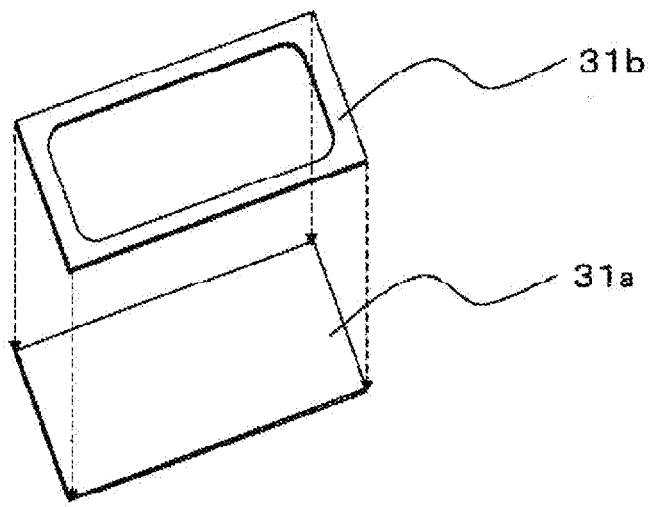
FIG. 1 is a view showing a production example of a compact part-forming preformed sheet.
Figure 1:
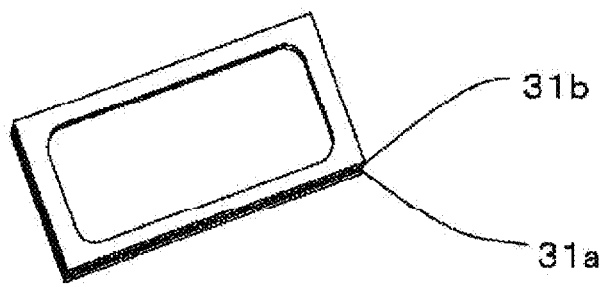
Figure 1:
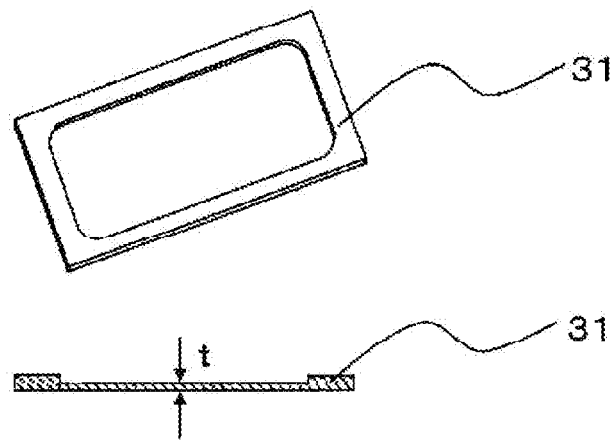

A method of producing a fuel cell separator according to one embodiment of the invention is described below.

The method of producing a fuel cell separator according to one embodiment of the invention produces a fuel cell separator that includes a porous part and a compact part, at least part of a wall surface of a gas passage being formed by the porous part, the method including pressing a compact part-forming material that includes a compact part-forming carbonaceous powder and a compact part-forming thermosetting resin binder at a temperature equal to or higher than the softening temperature of the compact part-forming thermosetting resin binder and less than the curing temperature of the compact part-forming thermosetting resin binder to obtain a compact part-forming preformed sheet, preparing a porous part-forming powder that includes a porous part-forming carbonaceous powder and a porous part-forming thermosetting resin binder, placing the compact part-forming preformed sheet and the porous part-forming powder in a forming die that has a concave-convex forming surface corresponding to the shape of the gas passage so that the concave-convex forming surface faces the porous part-forming powder, and hot-pressing the compact part-forming preformed sheet and the porous part-forming powder using the forming die at a temperature equal to or higher than the curing temperature of the compact part-forming thermosetting resin binder or the curing temperature of the porous part-forming thermosetting resin binder, whichever is the higher.

<Production of Compact Part-Forming Preformed Sheet>

The compact part-forming preformed sheet is obtained by pressing the compact part-forming material that includes the compact part-forming carbonaceous powder and the compact part-forming thermosetting resin binder at a temperature equal to or higher than the softening temperature of the compact part-forming thermosetting resin binder and less than the curing temperature of the compact part-forming thermosetting resin binder.

Specifically, the compact part-forming preformed sheet may be obtained by dissolving the compact part-forming thermosetting resin binder in an organic solvent optionally together with a phenol resin curing agent and a curing accelerator to obtain a binder resin solution (binder resin solution preparation step), dispersing the compact part-forming carbonaceous powder in the binder resin solution to obtain a slurry (slurry preparation step), applying the slurry to a film, drying the applied slurry, and removing the dried slurry to obtain a green sheet that is a compact part-forming material (green sheet-forming step), and stacking a plurality of the green sheets in a forming die, and pressing the green sheets at a temperature equal to or higher than the softening temperature of the compact part-forming thermosetting resin binder and less than the curing temperature of the compact part-forming thermosetting resin binder (pressing step).

(1) Binder Resin Solution Preparation Step

The binder resin solution (compact part-forming thermosetting resin binder-containing solution) may be prepared by dissolving the compact part-forming thermosetting resin binder in an appropriate organic solvent with stirring in a desired mass ratio optionally together with a phenol resin curing agent, a curing accelerator, and a dispersant in a minimum amount required to disperse the compact part-forming carbonaceous powder.

The compact part-forming thermosetting resin binder is not particularly limited as long as the compact part-forming thermosetting resin binder exhibits acid resistance to the electrolyte (e.g., sulfonic acid) and heat resistance sufficient to endure the operating temperature of the fuel cell. Examples of the compact part-forming thermosetting resin binder include a phenol resin such as a resol-type phenol resin and a novolac-type phenol resin, a furan resin such as a furfuryl alcohol resin, a furfuryl alcohol furfural resin, and a furfuryl alcohol phenol resin, a polyimide resin, a polycarbodiimide resin, a polyacrylonitrile resin, a pyrene-phenanthrene resin, a polyvinyl chloride resin, an epoxy resin such as a bifunctional aliphatic alcohol ether-type epoxy resin and a polyfunctional phenol-type epoxy resin, a urea resin, a diallyl phthalate resin, an unsaturated polyester resin, a melamine resin, and the like. These compact part-forming thermosetting resin binders may be used either individually or in combination.

The compact part-forming thermosetting resin binder is preferably a bifunctional aliphatic alcohol ether-type epoxy resin, a polyfunctional phenol-type epoxy resin, or a mixed resin of a bifunctional aliphatic alcohol ether-type epoxy resin and a polyfunctional phenol-type epoxy resin.

ramethylene glycol-type epoxy resin, and the like. Among these, a resin in which the number of oxygen atoms is relatively small is preferable. Specifically, water resistance increases as the number of oxygen atoms decreases, so that swelling of the resulting separator due to water can be suppressed.

Since the bifunctional aliphatic alcohol ether-type epoxy resin shown by the general formula (I) has a linear structure that contains only a single bond, the bifunctional aliphatic alcohol ether-type epoxy resin is flexible due to high molecular chain mobility, and readily exhibits rubber elasticity. This makes it possible to provide the separator with excellent flexibility, elasticity (stretch properties), and fracture strain properties.

The polyfunctional phenol-type epoxy resin is not particularly limited as long as the polyfunctional phenol-type epoxy resin is a compound that includes a phenol skeleton in the molecule, and includes two or more epoxy groups. Examples of the polyfunctional phenol-type epoxy resin include a bisphenol-type epoxy resin, a novolac-type epoxy resin, an orthocresol novolac-type epoxy resin, a biphenyl-type epoxy resin, a naphthalene-skeleton-containing epoxy resin, and the like.

Examples of the bisphenol-type epoxy resin include a bifunctional phenol-type epoxy resin.

The bifunctional phenol-type epoxy resin includes two epoxy groups in the molecule. Examples of the bifunctional phenol-type epoxy resin include a bisphenol A-type epoxy resin shown by the following general formula (II).

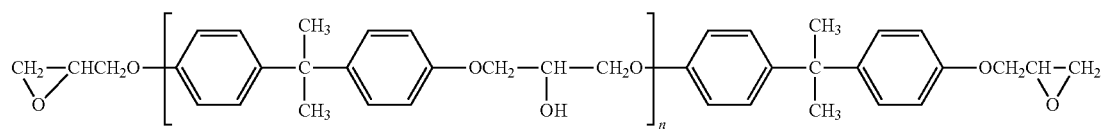

A bifunctional aliphatic alcohol ether-type epoxy resin shown by the following general formula (I) that has a number average molecular weight of 1500 to 3500 and a ratio "number average molecular weight/epoxy equivalent" of 2 or more is preferable as the bifunctional aliphatic alcohol ether-type epoxy resin.

wherein G represents a glycidyl group, O represents an oxygen atom, R represents an alkylene group having 2 to 10 carbon atoms, and k is an integer equal to or larger than 1, provided that a plurality of R may be either the same or different when k is an integer equal to or larger than 2.

If the total number of carbon atoms included in the k alkylene groups present between the glycidyl groups G in the epoxy resin shown by the general formula (I) exceeds 120, the separator material may exhibit a high fracture strain due to an increase in flexibility of the resin, but may exhibit a flexural strength of less than 30 MPa, for example. If the total number of carbon atoms is less than 30, the flexibility of the resin may decrease since the molecular chain present between the glycidyl groups is too short. k is preferably an integer from 8 to 30, and more preferably an integer from 15 to 25.

Examples of the bifunctional aliphatic alcohol ether-type epoxy resin shown by the general formula (I) include a hexanediol-type epoxy resin, a polyethylene glycol-type epoxy resin, a polypropylene glycol-type epoxy resin, a polyoxytetn in the general formula (II) is an integer from 1 to 10, preferably an integer from 1 to 5, and more preferably 2 or 3.

The bisphenol A-type epoxy resin shown by the general formula (II) that has a planar benzene ring exhibits low flexibility due to low molecular mobility, but provides the separator with high flexural strength.

Further examples of the polyfunctional phenol-type epoxy resin include a polyfunctional phenol-type epoxy resin that includes three or more functional groups. Examples of such a polyfunctional phenol-type epoxy resin include an epoxy resin shown by the following general formula (III).

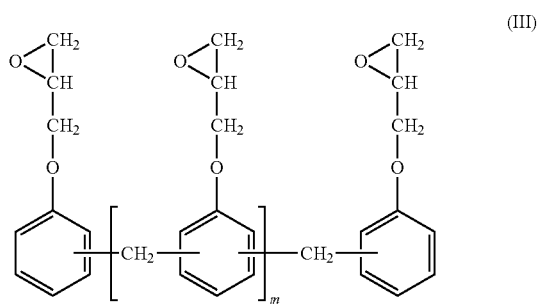

m in the general formula (III) is an integer from 3 to 8, preferably an integer from 4 to 8, and more preferably an integer from 5 to 7.

The pentafunctional phenol-type epoxy resin shown by the general formula (III) (i.e., m in the general formula (III) is 3) includes five epoxy groups in the molecule, and includes a benzene ring in the molecular skeleton. The pentafunctional phenol-type epoxy resin forms a three-dimensional structure upon curing to exhibit hardness and fragility, but provides the separator with high flexural strength.

When using a mixed resin of the bifunctional aliphatic alcohol ether-type epoxy resin and the polyfunctional phenol-type epoxy resin as the compact part-forming thermosetting resin binder, the resulting separator exhibits sufficient flexibility and flexural strength even if the thickness of the separator is reduced.

When using a mixed resin of the bifunctional aliphatic alcohol ether-type epoxy resin and the polyfunctional phenol-type epoxy resin as the compact part-forming thermosetting resin binder, the content of the bifunctional aliphatic alcohol ether-type epoxy resin is preferably 25 to 50 mass %, more preferably 30 to 45 mass %, and still more preferably 35 to 40 mass %, based on the total amount of the mixed resin and the phenol resin curing agent (described below). If the content of the bifunctional aliphatic alcohol ether-type epoxy resin is less than 25 mass %, the separator may easily crack due to a decrease in fracture strain. If the content of the bifunctional aliphatic alcohol ether-type epoxy resin exceeds 50 mass %, the separator may exhibit insufficient mechanical strength. The content of the polyfunctional phenol-type epoxy resin is preferably 25 to 50 mass %, more preferably 30 to 45 mass %, and still more preferably 35 to 40 mass %, based on the total amount of the mixed resin and the phenol resin curing agent (described below).

If the amount of the compact part-forming thermosetting resin binder is small, the strength of the separator may decrease. If the amount of the compact part-forming thermosetting resin binder is large, the electrical resistance of the separator may increase.

The phenol resin curing agent that may be included in the binder resin solution is not particularly limited as long as the phenol resin curing agent includes a phenol structure in the molecule. Examples of the phenol resin curing agent include a novolac resin such as a phenol novolac resin, a cresol novolac resin, a xylene-type phenol resin, a dicyclopentadiene-type phenol resin, and a bisphenol-type novolac resin, a bisphenol such as bisphenol A, bisphenol F, bisphenol S, and tetrabromobisphenol A, a bisphenol resin obtained by increasing the molecular weight of a bisphenol with a diglycidyl ether of the bisphenol, a bisphenol resin obtained by reacting epichlorohydrin and a bisphenol so that the bisphenol is in excess with respect to epichlorohydrin, and the like.

When using the polyfunctional phenol-type epoxy resin as the compact part-forming thermosetting resin binder, the phenol resin curing agent is preferably used so that the equivalent ratio of the phenolic hydroxyl groups included in the phenol resin to the epoxy groups included in the epoxy resin is 0.7 to 1.5, more preferably 0.9 to 1.1, and still more preferably about 1.0. If the equivalent ratio is less than 0.7, or exceeds 1.5, a large amount of the mixed resin or the phenol resin curing agent may remain unreacted, so that the efficiency may decrease.

The curing accelerator that may be included in the binder resin solution include may be at least one compound selected from a phosphorus compound, a tertiary amine, imidazole, an organic acid metal salt, a Lewis acid, an amine complex salt, and the like. When using the polyfunctional phenol-type epoxy resin as the compact part-forming thermosetting resin binder, the curing accelerator is normally used in an amount of 0.05 to 3 parts by mass based on 100 parts by mass of the resin.

The total amount of the compact part-forming thermosetting resin binder, the phenol resin curing agent, and the curing accelerator included in the binder resin solution is preferably 10 to 35 parts by mass based on 100 parts by mass of the compact part-forming carbonaceous powder.

The organic solvent used to prepare the binder resin solution is not particularly limited as long as the organic solvent is generally available, and dissolves the compact part-forming thermosetting resin binder. Examples of the organic solvent include an alcohol such as ethyl alcohol and isopropyl alcohol, and a ketone such as acetone and methyl ethyl ketone. It is most preferable to use methyl ethyl ketone taking into account the stability and the viscosity of a slurry and the sheet drying rate when forming a green sheet by the doctor blade method using a slurry (described below).

If the amount of the organic solvent is large, the compact part-forming carbonaceous powder may precipitate quickly, so that the green sheet may warp due to the difference in texture (structure) between the upper side and the lower side of the green sheet. If the amount of the organic solvent is small, the viscosity of the slurry may increase, so that the blade may drag an aggregate of the carbonaceous powder when forming a green sheet, and may form an irregular surface (i.e., it may be difficult to form a sheet).

Examples of the dispersant that may be included in the binder resin solution include a nonionic surfactant, a cationic surfactant, an anionic surfactant, and the like.

Examples of the nonionic surfactant include an aromatic ether-type polymer, a carboxylate-type polymer, an acrylate-type polymer, a phosphate-type polymer, a sulfonate-type polymer, a fatty acid ester-type polymer, a urethane-type polymer, a fluorine-type polymer, an aminoamide-type polymer, and an acrylamide-type polymer.

Examples of the cationic surfactant include a polymer that includes an ammonium group, a polymer that includes a sulfonium group, and a polymer that includes a phosphonium group.

Examples of the anionic surfactant include a carboxylic acid-type polymer, a phosphoric acid-type polymer, a sulfonic acid-type polymer, a hydroxyfatty acid-type polymer, and a fatty acid amide-type polymer.

The surfactant preferably has a polystyrene-reduced weight average molecular weight determined by gel permeation chromatography of 2000 to 100,000 so that the compact part-forming carbonaceous powder is dispersed in the organic solvent. If the weight average molecular weight of the surfactant is less than 2000, the polymer component may not form a sufficient three-dimensional repulsion layer when the dispersant is adsorbed on the surface of the compact part-forming carbonaceous powder, so that the dispersed particles may re-aggregate. If the weight average molecular weight of the surfactant exceeds 100,000, the production reproducibility may deteriorate, or the surfactant may function as a flocculant.

These surfactants may be used either individually or in combination.

The dispersant is preferably used in an amount of 0.1 to 5 parts by mass based on 100 parts by mass of the compact part-forming carbonaceous powder. If the amount of the dispersant is less than 0.1 parts by mass based on 100 parts by mass of the compact part-forming carbonaceous powder, the compact part-forming carbonaceous powder may not be dispersed, but may precipitate quickly. If the amount of the dispersant exceeds 5 parts by mass based on 100 parts by mass of the compact part-forming carbonaceous powder, the properties of the resin may deteriorate.

As a result, the mechanical properties (strength) of the separator material may deteriorate. Moreover, the chemical resistance (particularly the chemical resistance in a sulfuric acid solution) may deteriorate.

The binder resin solution may optionally include an additive (e.g., wet penetrant, preservative, anti-foaming agent, and surface-adjusting agent) other than the dispersant as long as the object of the invention is not impaired. This may make it possible to prepare a stable slurry, and obtain a green sheet having a smooth surface.

The binder resin solution may be prepared by adding the compact part-forming thermosetting resin binder to the organic solvent optionally together with the phenol resin curing agent, the curing accelerator, the dispersant, and the like, and stirring the mixture using a stirrer. The stirring time is preferably about 1 hour. The rotational speed of the stirrer is preferably about 100 to 1000 rpm.

(2) Slurry Preparation Step

In the slurry preparation step, the compact part-forming carbonaceous powder is added to the binder resin solution obtained by the step (1) to prepare a slurry in which the compact part-forming carbonaceous powder is dispersed.

Examples of the compact part-forming carbonaceous powder include a graphite powder such as an artificial graphite powder, a natural graphite powder, an expanded graphite powder, and a mixture thereof. Among these, an artificial graphite powder or a mixture of an artificial graphite powder and a natural graphite powder is preferable taking account of the mechanical properties (e.g., flexural strength and fracture strain) of the separator material. It is preferable to use the graphite powder after appropriately grinding the graphite powder using a grinder, and sieving (grading) the ground graphite powder. It is preferable that the compact part-forming carbonaceous powder have a volume average particle size of 1 to 100 μm and a maximum particle size of 150 μm or less.

Note that the term "volume average particle size" used herein refers to a value measured using a laser diffraction particle size analyzer, and the term "maximum particle size" used herein refers to the maximum particle size measured using a laser diffraction particle size analyzer.

If the volume average particle size and the maximum particle size of the compact part-forming carbonaceous powder are within the above range, the fluidity of the slurry can be improved while reducing the amount of the solvent, so that the slurry can be spread to a small thickness when forming a sheet, and rarely shows precipitation (i.e., is stable). If the particle size distribution of the compact part-forming carbonaceous powder is within the above range, the resulting sheet shows only a small degree of drying shrinkage and rarely cracks in the drying step using the doctor blade method (described below). Moreover, an excellent slurry can be obtained due to a filling effect (i.e., fine graphite powder particles enter the space between coarse graphite powder particles).

The compact part-forming carbonaceous powder is preferably a mixture of a graphite powder having a volume average particle size of 30 to 70 μm, a graphite powder having a volume average particle size of 5 to 10 μm, and a graphite powder having a volume average particle size of 1 to 3 μm in accordance with the Andreasen equation. In this case, a compact green sheet without cracks is obtained, and the resulting separator exhibits high gas impermeability even if the thickness is reduced. Note that the term "volume average particle size" used herein refers to a value measured using a laser diffraction particle size analyzer.

It is preferable that the compact part-forming carbonaceous powder have a compression recovery rate of 120% or less, more preferably 100 to 115%, and still more preferably 100 to 110%. The compression recovery rate refers to the ratio (%) of the volume of the carbonaceous powder that has been decompressed after being compressed at 50 MPa to the volume of the carbonaceous powder compressed at 50 MPa.

The binder resin solution and the compact part-forming carbonaceous powder are mixed so that the compact part-forming carbonaceous powder is dispersed in the binder resin solution to prepare a slurry.

It is preferable to mix the compact part-forming carbonaceous powder with the binder resin solution so that the mass ratio of the resin component (compact part-forming thermosetting resin binder, phenol resin curing agent, and curing accelerator) to the compact part-forming carbonaceous powder is 10:90 to 35:65. If the mass ratio of the resin component is less than 10% (i.e., the mass ratio of the compact part-forming carbonaceous powder exceeds 90%), it may be difficult to uniformly mix the components (i.e., the composition may become non-uniform) due to a decrease in fluidity caused by a decrease in the amount of thermosetting resin binder. If the mass ratio of the resin component exceeds 35% (i.e., the mass ratio of the compact part-forming carbonaceous powder is less than 65%), the electrical resistance of the formed body that includes the carbonaceous powder and the thermosetting resin binder may increase although the formability is improved). As a result, a fuel cell produced using the resulting separator may show a deterioration in performance.

The compact part-forming carbonaceous powder is preferably dispersed (mixed) in the binder resin solution using a disperser (e.g., universal stirrer, ultrasonic processor, cutter mixer, or triple roll). It is preferable to adjust the viscosity of the slurry obtained by dispersing the carbonaceous powder in the binder resin solution to 100 to 1000 cP by appropriately adding an organic solvent. If the viscosity of the slurry is less than 100 cP, outflow of the slurry (raw material) from the doctor blade may occur when forming a green sheet (i.e., the sheet may become wider), so that a sheet having a uniform thickness may not be obtained. If the viscosity of the slurry exceeds 1000 cP, the blade may drag an aggregate of the carbonaceous powder when forming a green sheet, and may form an irregular surface (i.e., it may be difficult to form a sheet).

Note that the surface of the green sheet may become irregular and may have poor homogeneity due to air incorporated by mixing/dispersion operation. Therefore, it is preferable to remove air from the slurry by centrifugation, vacuum de-aeration, or the like.

(3) Green Sheet-Forming Step

The slurry prepared by the step (2) is applied to a film (e.g., polyester film) by the doctor blade method. Specifically, the gap between the doctor blade and the film is appropriately adjusted to about 0.2 to 0.8 mm. The slurry that is stirred using a stirrer is poured into the slurry hopper of the doctor blade, and is applied to the film (to which a release agent is preferably applied) to a uniform thickness.

The thickness of the resulting green sheet can be adjusted by adjusting the gap between the doctor blade and the film, and the concentration of the slurry. It is preferable to control the thickness of the green sheet so that the dried green sheet has a thickness of 0.1 to 0.5 mm.

It is preferable to dry the green sheet until the solvent is volatilized when observed with the naked eye by allowing the green sheet to dry, or optionally cutting the green sheet to a given thickness, and air-drying the green sheet using an electric fan or the like. It is preferable remove the film from the surface of the green sheet after cutting the green sheet to given dimensions using a cutter knife, or cutting the green sheet to a given shape and given dimensions using a punching die, and drying or cooling the green sheet for a given time so that the film can be easily removed from the green sheet.

According to the doctor blade method, a slurry prepared using the raw material powder (e.g., carbonaceous powder), the thermosetting resin binder, the dispersant, the organic solvent, and the like is continuously applied to a carrier film to a constant thickness using a doctor blade apparatus, and then dried so that the organic solvent is volatilized (evaporated) to obtain a green sheet. Since the doctor blade method successively (continuously) implements the sheet forming step, the drying step, the take-up step the punching step, and the like, the green sheet (compact part-forming material) can be obtained with high production efficiency.

Since the green sheet thus obtained is formed of a compact (dense) resin film, the gas impermeability of the resulting separator material can be improved.

The thickness of the green sheet is preferably 0.1 to 1.0 mm, more preferably 0.15 to 0.8 mm, and still more preferably 0.2 to 0.6 mm.

(4) Pressing Step

The green sheet obtained by the step (3) is pressed at a temperature equal to or higher than the softening temperature of the compact part-forming thermosetting resin binder that forms the green sheet and less than the curing temperature of the compact part-forming thermosetting resin binder to obtain a compact part-forming preformed sheet.

When the compact part-forming thermosetting resin binder has been prepared by mixing a plurality of thermosetting resins, the green sheet obtained is pressed at a temperature equal to or higher than the highest softening temperature among the softening temperatures of the plurality of thermosetting resins included in the compact part-forming thermosetting resin binder and less than the lowest curing temperature among the curing temperatures of the plurality of thermosetting resins included in the compact part-forming thermosetting resin binder.

For example, a compact main part-forming green sheet 31a and a compact edge-forming green sheet 31b shown in FIG. 1(a) may be placed in a die in a stacked state (see in FIG. 1(b)), preheated at the above temperature together with the die using a hot plate or the like, placed in a press, and maintained in a pressed state until a temperature less than the softening temperature of the compact part-forming thermosetting resin binder is reached. A compact part-forming preformed sheet 31 that has an edge area shown in FIG. 1(c) may thus be obtained. Note that the upper drawing in FIG. 1(c) is a perspective view showing the compact part-forming preformed sheet 31, and the lower drawing in FIG. 1(c) is a vertical cross-sectional view showing the compact part-forming preformed sheet 31 with respect to the main surface of the compact part-forming preformed sheet 31. The number of the compact main part-forming green sheets 31a, the number of the compact edge-forming green sheets 31b, and the like may be appropriately changed depending on the thickness of the desired compact part-forming preformed sheet.

The compact part-forming preformed sheet is preferably formed by stacking 2 to 6 green sheets. When the compact part-forming preformed sheet is formed as shown in FIG. 1(c), the compact part-forming preformed sheet is preferably formed by stacking 1 to 3 compact main part-forming green sheets 31a and 1 to 3 compact edge-forming green sheets 31b, and pressing the stacked green sheets.

The pressing pressure is preferably 20 to 100 MPa, more preferably 20 to 80 MPa, and still more preferably 20 to 60 MPa. The pressing time is preferably 1 to 600 seconds, more preferably 1 to 300 seconds, and still more preferably 1 to 30 seconds. Note that the pressed state may be appropriately canceled to remove gas instead of continuously maintaining the pressed state. If the pressing pressure is within the above range, the resulting separator exhibits the desired strength and gas impermeability.

The thickness of the compact part-forming preformed sheet is preferably 0.05 to 0.5 mm, more preferably 0.075 to 0.4 mm, and still more preferably 0.1 to 0.3 mm. When the compact part-forming preformed sheet is formed as shown in FIG. 1(c), the thickness of the compact part-forming preformed sheet refers to the thickness t shown in FIG. 1(c).

Since the compact part-forming preformed sheet is formed of the green sheet having the above compact (dense) structure, it is possible to form a separator that exhibits high gas impermeability even if the separator has a small thickness.

<Preparation of Porous Part-Forming Powder>

The porous part-forming powder includes the porous part-forming carbonaceous powder and the porous part-forming thermosetting resin binder.

The porous part-forming powder may be obtained by dissolving the porous part-forming thermosetting resin binder in an organic solvent optionally together with a phenol resin curing agent and a curing accelerator to obtain a binder resin solution (binder resin solution preparation step), mixing (kneading) the binder resin solution and the porous part-forming carbonaceous powder (mixing step), and drying and grinding the resulting mixture (drying-grinding step).

(1) Binder Resin Solution Preparation Step

Examples of the porous part-forming thermosetting resin binder include those mentioned above in connection with the compact part-forming thermosetting resin binder. Examples of the phenol resin curing agent, the curing accelerator, the dispersant, the organic solvent, and the like that are optionally used when preparing the binder resin solution using the porous part-forming thermosetting resin binder include those mentioned above that are optionally used when preparing the binder resin solution using the compact part-forming thermosetting resin binder. The amount of each component of the binder resin solution, the binder resin solution preparation method, and the like are the same as those mentioned above in connection with the method of preparing the binder resin solution using the compact part-forming thermosetting resin binder.

(2) Mixing Step

The binder resin solution obtained by the step (1) and the porous part-forming carbonaceous powder are mixed (kneaded).

Examples of the porous part-forming carbonaceous powder include a graphite powder such as an artificial graphite powder, a natural graphite powder, an expanded graphite powder, and a mixture thereof. Among these, an artificial graphite powder or a mixture of an artificial graphite powder and a natural graphite powder is preferable taking account of the mechanical properties (e.g., flexural strength and fracture strain) of the separator material. It is preferable to use the graphite powder after appropriately grinding the graphite powder using a grinder, and sieving (grading) the ground graphite powder.

The volume average particle size of the porous part-forming carbonaceous powder is preferably 50 to 500 μm, more preferably 50 to 400 μm, and still more preferably 50 to 300 μm. If the volume average particle size of the porous part-forming carbonaceous powder is less than 50 the gas passage may be clogged due to water produced during electricity generation. If the volume average particle size of the porous part-forming carbonaceous powder exceeds 500 μm, the thickness of the porous part may unnecessarily increase.

Note that the term "volume average particle size" used herein refers to a value measured using a laser diffraction particle size analyzer.

The binder resin solution and the porous part-forming carbonaceous powder are mixed (kneaded) using a mixer (e.g., kneader) or the like.

The binder resin solution and the porous part-forming carbonaceous powder are preferably used so that the total amount of the porous part-forming thermosetting resin binder, the phenol resin curing agent, and the curing accelerator included in the binder resin solution is 10 to 35 parts by mass based on 100 parts by mass of the porous part-forming carbonaceous powder.

When mixing the binder resin solution and the porous part-forming carbonaceous powder using a kneader, the rotational speed of the kneader is preferably 1 to 100 rpm, more preferably 5 to 75 rpm, and still more preferably 10 to 50 rpm. The mixing time is preferably 10 to 300 minutes, more preferably 15 to 180 minutes, and still more preferably 20 to 60 minutes.

(3) Drying-Grinding Step

The mixture obtained by the step (2) is dried, and then ground.

It is preferable to dry the mixture until the solvent is volatilized when observed with the naked eye by allowing the mixture to dry, and optionally air-drying the mixture using an electric fan or the like. It is more preferable to remove the organic solvent as much as possible via vacuum drying.

The mixture may be ground using a mill, a cutter grinder, or the like.

The porous part-forming powder may thus be obtained. The volume average particle size of the porous part-forming powder is preferably 22 to 850 μm, more preferably 42 to 680 μm, and still more preferably 66 to 510 μm.

Note that the term "volume average particle size" used herein refers to a value measured using a laser diffraction particle size analyzer.

Note that the compact part-forming preformed sheet and the porous part-forming powder may be prepared in an arbitrary order. The compact part-forming preformed sheet may be prepared prior to the porous part-forming powder, or the porous part-forming powder may be prepared prior to the compact part-forming preformed sheet, or the compact part-forming preformed sheet and the porous part-forming powder may be prepared at the same time.

<Filling Step and Hot-Pressing Step>

The compact part-forming preformed sheet and the porous part-forming powder are placed in a forming die that has a concave-convex forming surface corresponding to the shape of the gas passage so that the concave-convex forming surface faces the porous part-forming powder.

The forming die may include a pair of an upper die and a lower die. The upper die may include the concave-convex forming surface corresponding to the shape of the gas passage. A release agent may be appropriately applied to the forming surface of the forming die.

Figure 2:
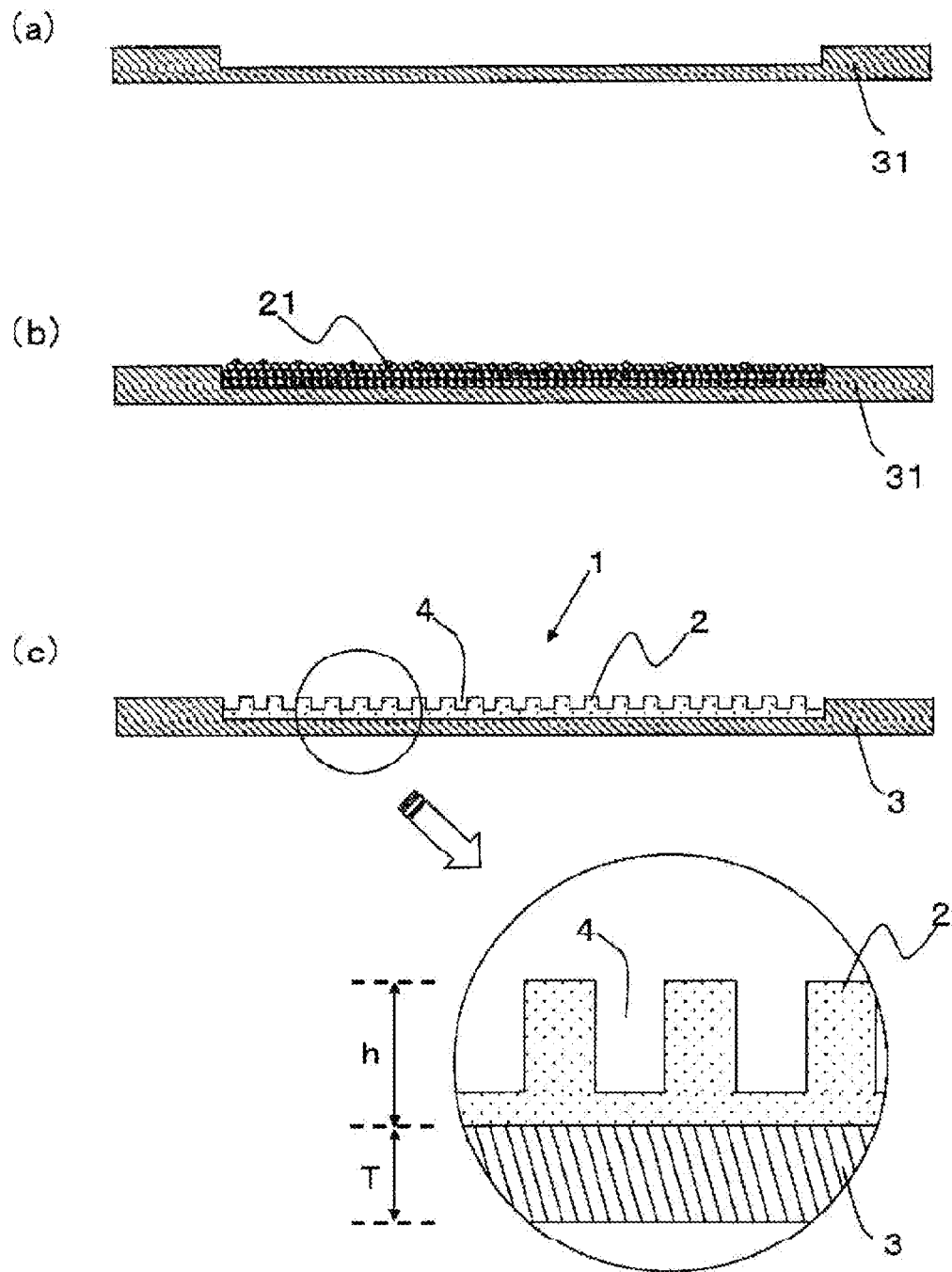
FIG. 2 is a view showing an example of a method of producing a fuel cell separator according to one embodiment of the invention.

In the filling step, the compact part-forming preformed sheet 31 having a cross-sectional shape as shown in FIG. 2(*a*) is placed on the lower die. As shown in FIG. 2(*b*), a given amount of porous part-forming powder 21 is placed on the compact part-forming preformed sheet 31 so that a porous part having a desired thickness is formed. The upper die that includes the concave-convex forming surface corresponding to the shape of the gas passage is then placed over the porous part-forming powder 21.

The compact part-forming preformed sheet 31 and the porous part-forming powder 21 are hot-pressed under a given pressure at a temperature equal to or higher than the curing temperature of the compact part-forming thermosetting resin binder or the curing temperature of the porous part-forming thermosetting resin binder, whichever is the higher.

When the compact part-forming thermosetting resin binder or the porous part-forming thermosetting resin binder has been prepared by mixing a plurality of thermosetting resins, the compact part-forming preformed sheet 31 and the porous part-forming powder 21 are hot-pressed at a temperature equal to or higher than the highest curing temperature among the curing temperatures of the plurality of thermosetting resins included in the compact part-forming thermosetting resin binder or the porous part-forming thermosetting resin binder.

The hot-pressing temperature is preferably about 150 to 250° C. The hot-pressing pressure is preferably about 1 MPa or more and less than 20 MPa, more preferably 1 to 15 MPa, and still more preferably 1 to 10 MPa. If the hot-pressing pressure is less than 1 MPa, a strength that is sufficient to maintain the shape of the porous part may not be obtained. If the hot-pressing pressure is 20 MPa or more, a porous structure may not be obtained (i.e., the pores may be clogged).

The resulting hot-pressed product may optionally be machined, and may optionally be post-cured at about 150 to 250° C.

It is preferable to appropriately hydrophilize the hot-pressed product. The hot-pressed product may be hydrophilized by an ozone gas treatment or the like. The ozone gas treatment is preferably performed by exposing the hot-pressed product to ozone gas at a concentration of 1000 to 50,000 ppm (mg/l) for 0.5 to 10 hours at a temperature of 0 to 100° C.

The compact part-forming thermosetting resin binder and the porous part-forming thermosetting resin binder are cured by hot-pressing, so that the compact part-forming carbonaceous powder and the porous part-forming carbonaceous powder are respectively bound integrally, and the compact part and the porous part are strongly bonded. It is thus possible to obtain a separator in which contact resistance between the compact part and the porous part is reduced.

As illustrated in FIG. 2(*c*), a separator 1 obtained by the method according to one embodiment of the invention includes a porous part 2 and a compact part 3, at least part of the wall surface of a gas passage 4 being formed by the porous part 2.

The thickness of the porous part included in the separator is preferably 0.1 to 2.0 ran, more preferably 0.2 to 1.5 mm, and still more preferably 0.3 to 1.0 mm. When the separator is formed as shown in FIG. 2(*c*), the thickness of the porous part refers to the thickness h shown in FIG. 2(*c*). The pore size of the porous part is preferably 5 to 60 μm, more preferably 10 to 55 μm, and still more preferably 15 to 50 μm. The porosity of the porous part is preferably 5 to 50%, more preferably 12.5 to 50%, and still more preferably 20 to 50%. The terms "pore size" and "porosity" used herein refer to values measured by mercury porosimetry in accordance with JIS R 1655.

The thickness of the compact part included in the separator is preferably 0.15 to 0.5 mm, more preferably 0.15 to 0.4 mm, and still more preferably 0.15 to 0.3 mm. When the separator is formed as shown in FIG. 2(*c*), the thickness of the compact part refers to the thickness T shown in FIG. 2(*c*). The gas permeation coefficient of the compact part is preferably $1 \times 10^{-12}$ to $1 \times 10^{-10}$ mol·m·m$^{-2}$·sec$^{-1}$·MPa$^{-1}$, more preferably $1\times10^{-12}$ to $5\times10^{-11}$ mol·m·m$^{-2}$·sec$^{-1}$·MPa$^{-1}$, and still more preferably $1\times10^{-12}$ to $1\times10^{-11}$ mol·m·m$^{-2}$·sec$^{-1}$·MPa$^{-1}$.

The gas permeation coefficient may be calculated by measuring the gas permeation amount of gas permeated per unit time and unit cross-sectional area when applying a differential pressure of 0.2 MPa using nitrogen gas.

The contact resistance between the compact part and the porous part included in the separator is preferably 1 mΩ·cm$^2$ or less, and more preferably 0.5 mΩ·cm$^2$ or less.

The term "contact resistance" used herein refers to a value measured at 1 A while applying a pressure of 1 MPa to a test piece sampled from the separator.

A separator obtained by the method according to one embodiment of the invention may suitably be used as a polymer electrolyte fuel cell separator.

The method according to one embodiment of the invention presses the compact part-forming material to fowl a compact part-forming preformed sheet, and hot-presses the preformed sheet and the porous part-forming powder to form a separator, instead of hot-pressing a compact part-forming material and a porous part-forming material using a single forming die, or hot-pressing a porous part and a compact part that have been hot-pressed in advance using a single forming die. Since the compact part-forming material is pressed under a desired pressure to obtain the compact part-forming preformed sheet, the compact part exhibits the desired gas impermeability. A porous part having the desired porosity can be formed by controlling the hot-pressing conditions for the preformed sheet and the porous part-forming powder. Since the compact part-forming preformed sheet and the porous part-forming powder are hot-pressed at a temperature equal to or higher than the curing temperature of the compact part-forming thermosetting resin binder or the curing temperature of the porous part-forming thermosetting resin binder, whichever is the higher, the compact part-forming thermosetting resin binder and the porous part-forming thermosetting resin binder can be cured, so that the compact part-forming carbonaceous powder and the porous part-forming carbonaceous powder are respectively bound integrally, and the compact part and the porous part are strongly bonded. This makes it possible to reduce contact resistance between the compact part and the porous part.

A separator obtained by the method according to one embodiment of the invention may suitably be used as a polymer electrolyte fuel cell separator.

Figure 3:
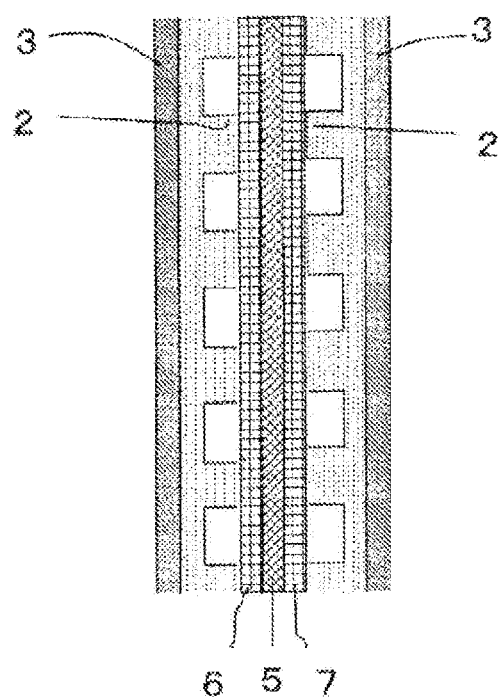
FIG. 3 is a view illustrative of a fuel cell single cell that utilizes a fuel cell separator obtained by a method according to one embodiment of the invention.

As shown in FIG. 3, a unit cell of a fuel cell may be produced using a separator obtained by the method according to one embodiment of the invention by disposing an anode 6 and a cathode 7 that support a catalyst (e.g., platinum) on either side of a ion-conductive polymer membrane 5 (ion-exchange membrane), and disposing a plate-like separator that includes a porous part 2 and a compact part 4 on each side of the stacked structure.

EXAMPLES

The invention is further described below by way of examples. Note that the invention is not limited to the following examples.

Example 1

1. Production of Compact Part-Forming Preformed Sheet
(1) Binder Resin Solution Preparation Step An epoxy resin ("EPICLON N-680" (polyfunctional phenol-type epoxy resin) manufactured by DIC Corporation, softening temperature: 85° C.) (compact part-forming thermosetting resin binder) and a novolac-type phenol resin ("H-1" manufactured by Meiwa Plastic Industries, Ltd., softening temperature: 85° C.) (curing agent) were mixed in a weight ratio of 2:1 so that the amount of the epoxy resin was 20 parts by mass based on 100 parts by mass of a graphite powder (compact part-forming carbonaceous powder) to obtain a mixed resin. 2-Ethyl-4-methylidazole (curing accelerator) was added to the mixed resin so that the equivalent ratio of the phenolic hydroxyl groups included in the phenol resin to the epoxy groups included in the epoxy resin was 1. Methyl ethyl ketone (MEK) (solvent) was added to the mixture so that the amount of methyl ethyl ketone was 110 parts by mass based on 100 parts by mass of the graphite powder. An anionic surfactant ("Homogenol L-18" (polycarboxylic acid-type polymer) manufactured by Kao Corporation) (dispersant) was added to the mixture so that the amount of the anionic surfactant was 1 part by mass based on 100 parts by mass of the graphite powder to prepare a binder resin solution.

The curing temperature of the compact part-forming thermosetting resin binder included in the binder resin solution was 120° C.

(2) Slurry Preparation Step

A given amount of a flake-like natural graphite powder (maximum particle size: 150 μm) was added to a given amount of the binder resin solution obtained by the step (1). The mixture was sufficiently mixed using a stirrer while adjusting the viscosity of the mixture to 200 cP by adding methyl ethyl ketone (MEK). Air contained in the mixture was removed by centrifugation to obtain a raw material slurry containing the resin component (i.e., the compact part-forming thermosetting resin binder, the phenol resin curing agent, and the curing accelerator included in the binder resin solution obtained by the step (1)) and the compact part-forming carbonaceous powder in a mass ratio of 17:83.

(3) Green Sheet-Forming Step

The raw material slurry obtained by the step (2) was supplied to a green sheet-forming apparatus including a doctor blade. A sheet-shaped product was formed by the doctor blade method, and sufficiently dried to obtain a green sheet having a thickness of about 0.3 mm.

(4) Pressing Step

The green sheet obtained by the step (3) was punched to a given shape using a punching die, and removed from the film. Two compact main part-forming green sheets 31a and two compact edge-forming green sheets 31b formed as shown in FIG. 1(a) were stacked to obtain a green sheet stack having a given thickness and having the configuration shown in FIG. 1(b).

The green sheet stack was placed in a forming die (outer dimensions: 270×270 mm, a fluorine-type release agent was applied to the forming surface), and preheated so that the temperature of the forming die was 100° C. The green sheet stack was then placed in a press, and hot-pressed under a pressure of 40 MPa for 30 seconds until a temperature equal to or less than the softening temperature of the epoxy resin used as the compact part-forming thermosetting resin binder was reached, to obtain a compact part-forming preformed sheet 31 (length: 270 mm, width: 270 mm, thickness: 0.3 mm) (see FIG. 1(c)).

2. Preparation of Porous Part-Forming Powder
(1) Binder Resin Solution Preparation Step An epoxy resin ("EPICLON N-680" (polyfunctional phenol-type epoxy resin) manufactured by DIC Corporation, softening temperature: 85° C.) (porous part-forming thermosetting resin binder) and a novolac-type phenol resin ("H-1" manufactured by Meiwa Plastic Industries, Ltd., softening temperature: 85° C.) (curing agent) were mixed in a weight ratio of 2:1 so that the amount of the epoxy resin was 20 parts by mass based on 100 parts by mass of a graphite powder (porous part-forming carbonaceous powder) to obtain a mixed resin. 2-Ethyl-4-methylidazole (curing accelerator) was added to the mixed resin so that the equivalent ratio of the phenolic hydroxyl groups included in the phenol resin to the epoxy groups included in the epoxy resin was 1. Methyl ethyl ketone (MEK) (solvent) was added to the mixture so that the amount of methyl ethyl ketone was 110 parts by mass based on 100 parts by mass of the graphite powder. An anionic surfactant ("Homogenol L-18" (polycarboxylic acid-type polymer) manufactured by Kao Corporation) (dispersant) was added to the mixture so that the amount of the anionic surfactant was 1 part by mass based on 100 parts by mass of the graphite powder to prepare a binder resin solution.

The curing temperature of the porous part-forming thermosetting resin binder included in the binder resin solution was 120° C.

(2) Mixing Step

An artificial graphite powder size-controlled so that the volume average particle size was 80 μm was used as the porous part-forming carbonaceous powder. The artificial graphite powder was added to the binder resin solution so that the ratio of the total mass of the resin component (porous part-forming thermosetting resin binder, phenol resin curing agent, and curing accelerator) included in the binder resin solution to the mass of the artificial graphite powder was 20:80, and the components were mixed (kneaded) at 30 rpm for 1 hour using a kneader ("KH-10-F" manufactured by Inoue Mfg., Inc.) to obtain a mixture.

(3) Drying-Grinding Step

The mixture was air-dried at room temperature for 24 hours, vacuum-dried to remove methyl ethyl ketone via volatilization, and ground using a Nara-type grinder to obtain a porous part-forming powder having a volume average particle size of 110 μm.

3. Filling and Hot-Pressing

A forming die (outer dimensions: 270×270 mm) including a pair of an upper die and a lower die was used. Grooves (width: 1 mm, depth: 0.6 mm) were formed in the forming surface of the upper die within the range of 200×200 mm, and a fluorine-type release agent was applied to the forming surface.

The compact part-forming preformed sheet was disposed on the lower die of the forming die so that the main surface having the edge area faced upward. As shown in FIG. 2(b), 86.3 g of the porous part-forming powder 21 was evenly placed in the depression of the compact part-forming preformed sheet 31 enclosed by the edge area, and the upper die was disposed so that the forming surface of the upper die faced the porous part-forming powder. The porous part-forming powder 21 was hot-pressed at a temperature of 180° C. under a pressure of 5 MPa to obtain a hot-pressed product.

The hot-pressed product was hydrophilized (oxidized) by exposing the hot-pressed product to ozone gas (concentration: 30,000 ppm (mg/l)) at 25° C. for 5 hours to obtain a fuel cell separator having the shape shown in FIG. 2(c).

The resulting fuel cell separator 1 had a length of 270 mm and a width of 270 mm. The thickness T of the compact part 3 was 0.3 mm, and the thickness h of the porous part 2 was 0.5 mm.

The porosity and the pore size of the porous part 2, the intrinsic resistivity of the separator 1, the contact resistance between the porous part 2 and the compact part 3, the gas permeation coefficient of the separator 1, and drainage during electricity generation were measured by the following methods. The results are shown in Table 1.

<Pore Size (μm) and Porosity (%) of Porous Part>

The pore size and the porosity of the porous part were measured by mercury porosimetry in accordance with JIS R 1655.

<Intrinsic Resistivity (mΩ·CM) of Separator>

The intrinsic resistivity of the separator was measured in accordance with JIS C 2525.

<Contact Resistance (mΩ·cm$^2$) Between Porous Part and Compact Part>

A test piece was obtained by cutting the separator to a desired size. The contact resistance was measured at 1 A while applying pressure of 1 MPa to the test piece.

<Gas Permeation Coefficient ($10^{-12}$ mol·m·m$^{-2}$·sec$^{-1}$·MPa$^{-1}$)>

The gas permeation coefficient was determined by measuring the amount of gas permeated per unit time and unit cross-sectional area when applying a differential pressure of 0.2 MPa using nitrogen gas.

<Drainage>

Water produced during electricity generation was observed with the naked eye, and drainage was evaluated based on the presence or absence of flooding.

An anode and a cathode supporting platinum was disposed on either side of a Nafion membrane (manufactured by DuPont). The fuel cell separators obtained in Example 1 were disposed on the anode side and the cathode side to form a cell. Electricity was generated for 1 hour using the cell. The cell was then disassembled, and water present in the grooves of the separator was observed with the naked eye. Drainage was evaluated based on the presence or absence of flooding.

Example 2

A fuel cell separator 1 having the shape shown in FIG. 2(c) was obtained in the same manner as in Example 1, except that the compact part-forming preformed sheet and the porous part-forming powder were hot-pressed at a temperature of 180° C. under a pressure of 1 MPa.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 3

A fuel cell separator 1 having the shape shown in FIG. 2(c) was obtained in the same manner as in Example 1, except that an artificial graphite powder size-controlled so that the volume average particle size was 160 μm was used as the porous part-forming carbonaceous powder, and the compact part-forming preformed sheet and the porous part-forming powder were hot-pressed at a temperature of 180° C. under a pressure of 10 MPa.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 4

A fuel cell separator 1 having the shape shown in FIG. 2(c) was obtained in the same manner as in Example 1, except that an artificial graphite powder size-controlled so that the volume average particle size was 160 μm was used as the porous part-forming carbonaceous powder, and the compact part-forming preformed sheet and the porous part-forming powder were hot-pressed at a temperature of 180° C. under a pressure of 15 MPa.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 5

A fuel cell separator 1 having the shape shown in FIG. 2(c) was obtained in the same manner as in Example 1, except that the forming pressure was set to 60 MPa when forming the compact part-forming preformed sheet, and an artificial graphite powder size-controlled so that the volume average particle size was 240 μm was used as the porous part-forming carbonaceous powder.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 6

A fuel cell separator 1 having the shape shown in FIG. 2(c) was obtained in the same manner as in Example 1, except that the forming pressure was set to 90 MPa when forming the compact part-forming preformed sheet.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 7

A fuel cell separator 1 having the shape shown in FIG. 2(c) was obtained in the same manner as in Example 1, except that an artificial graphite powder size-controlled so that the volume average particle size was 500 μm was used as the porous part-forming carbonaceous powder.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 8

A fuel cell separator 1 having the shape shown in FIG. 2(c) was obtained in the same manner as in Example 1, except that an artificial graphite powder size-controlled so that the volume average particle size was 240 μm was used as the porous part-forming carbonaceous powder, and the compact part-forming preformed sheet and the porous part-forming powder were hot-pressed at a temperature of 180° C. under a pressure of 20 MPa.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Example 9

A fuel cell separator 1 having the shape shown in FIG. 2(c) was obtained in the same manner as in Example 1, except that an artificial graphite powder size-controlled so that the volume average particle size was 50 μm was used as the porous part-forming carbonaceous powder, and the compact part-forming preformed sheet and the porous part-forming powder were hot-pressed at a temperature of 180° C. under a pressure of 1 MPa.

The porosity and the pore size of the porous part 2, the intrinsic resistivity of the separator 1, the contact resistance between the porous part 2 and the compact part 3, the gas permeation coefficient of the separator 1, and drainage during electricity generation were measured in the same manner as in Example 1. The results are shown in Table 1.

Comparative Example 1

A fuel cell separator having the shape shown in FIG. 2(c) was obtained in the same manner as in Example 1, except that the forming die was preheated to 150° C. (i.e., a temperature higher than the curing temperature (120° C.) of the compact part-forming thermosetting resin binder) when forming the compact part-forming preformed sheet, and the green sheet stack was pressed for 10 seconds under a pressure of 40 MPa. The porosity and the pore size of the porous part, the intrinsic resistivity of the separator, the contact resistance between the porous part and the compact part, the gas permeation coefficient of the separator, and drainage during electricity generation were measured in the same manner as in Example 1. The results are shown in Table 1.

Comparative Example 2

Green sheets obtained by the steps (1) to (3) in 1. of Example 1 were stacked to obtain a green sheet stack (i.e., a green sheet stack obtained by stacking two compact main part-forming green sheets 31a shown in FIG. 1(a)). The green sheet stack was hot-pressed at a temperature of 180° C. under a pressure of 40 MPa using the forming die used in 3. of Example 1 without pressing the green sheet stack and stacking a porous-part-forming powder on the green sheet stack. A fuel cell separator was thus obtained.

The intrinsic resistivity and the gas permeation coefficient of the separator, and drainage during electricity generation were measured in the same manner as in Example 1. The results are shown in Table 1.

TABLE 1

| | Porosity of porous part (%) | Pore size of porous part (μm) | Intrinsic resistivity of separator (mΩ·cm) | Contact resistance (mΩ·cm²) | Gas permeation coefficient (×10$^{-12}$ mol·m· m$^{-2}$·sec$^{-1}$·MPa$^{-1}$) | Drainage |
|---|---|---|---|---|---|---|
| Example 1 | 40 | 21 | 15 | 0.2 | 2.2 | Acceptable |
| Example 2 | 43 | 25 | 17 | 0.3 | 1.9 | Acceptable |
| Example 3 | 38 | 26 | 16 | 0.2 | 2.3 | Acceptable |
| Example 4 | 35 | 18 | 15 | 0.4 | 1.8 | Acceptable |
| Example 5 | 41 | 45 | 15 | 0.3 | 2.1 | Acceptable |
| Example 6 | 41 | 23 | 19 | 0.3 | 2.2 | Acceptable |
| Example 7 | 40 | 98 | 18 | 0.2 | 2.3 | Acceptable |
| Example 8 | 30 | 17 | 18 | 0.3 | 1.9 | Acceptable |
| Example 9 | 39 | 14 | 16 | 0.5 | 2 | Acceptable |
| Comparative Example 1 | 39 | 21 | 20 | 8.9 | 2.3 | Acceptable |
| Comparative Example 2 | — | — | 9.5 | — | 2.0 | Unacceptable |

The fuel cell separators of Example 1 to 9 were obtained by pressing the compact part-forming preformed sheet in advance, and hot-pressing the compact part-forming preformed sheet together with the porous part-forming powder. Therefore, a different pressure was applied to the compact part and the porous part when producing the fuel cell separator. As a result, the compact part of the fuel cell separators of Example 1 to 9 exhibited high gas impermeability, and the porous part exhibited excellent drainage due to a high porosity and a large pore size (see Table 1). Since the compact part and the porous part were formed and integrated while simultaneously curing the compact part-forming thermosetting resin binder included in the compact part-forming preformed sheet and the porous part-forming thermosetting resin binder included in the porous part-forming powder, the contact resistance between the compact part and the porous part was reduced.

In Comparative Example 1, since the forming die was preheated to 150° C. (i.e., a temperature higher than the curing temperature of the epoxy resin) when forming the compact part-forming preformed sheet, the bonding strength between the compact part and the porous part of the resulting fuel cell separator was low, and the contact resistance was as high as 8.9 mΩ·cm².

In Comparative Example 2, drainage was poor since the separator did not include the porous part.

Industrial Applicability

The invention thus provides a method of producing a fuel cell separator that suppresses a situation in which the flow passage is clogged by water produced during electricity generation, suppresses a decrease in electricity generation efficiency and an increase in contact resistance, and exhibits excellent strength and gas impermeability List of Reference Symbols 1 Fuel cell separator
2 Porous part
3 Compact part
4 Gas passage
5 Ion-exchange membrane
6 Anode
7 Cathode
21 Porous part-forming powder
31 Compact part-forming preformed sheet
31a Compact main part-forming green sheet
31b Compact edge-forming green sheet

The invention claimed is:

1. A method of producing a fuel cell separator that includes a porous part and a compact part, at least part of a wall surface of a gas passage being formed by the porous part, the method comprising pressing a compact part-forming material that includes a compact part-forming carbonaceous powder and a compact part-forming thermosetting resin binder under a pressure of 20 to 100 MPa at a temperature equal to or higher than a softening temperature of the compact part-forming thermosetting resin binder and less than a curing temperature of the compact part-forming thermosetting resin binder to obtain a compact part-forming preformed sheet, preparing a porous part-forming powder that includes a porous part-forming carbonaceous powder and a porous part-forming thermosetting resin binder, placing the compact part-forming preformed sheet and the porous part-forming powder in a forming die that has a concave-convex forming surface corresponding to a shape of the gas passage so that the concave-convex forming surface faces the porous part-forming powder, and hot-pressing the compact part-forming preformed sheet and the porous part-forming powder using the forming die under a pressure of 1 MPa or more and less than 20 MPa at a temperature equal to or higher than the curing temperature of the compact part-forming thermosetting resin binder or a curing temperature of the porous part-forming thermosetting resin binder, whichever is higher.

2. The method of producing a fuel cell separator according to claim 1, wherein the porous part-forming carbonaceous powder has a volume average particle size of 50 to 500 μm.

3. The method of producing a fuel cell separator according to claim 1, further comprising hydrophilizing a product obtained by the hot-pressing.

* * * * *

UNITED STATES PATENT AND TRADEMARK OFFICE
CERTIFICATE OF CORRECTION

PATENT NO.        : 8,524,129 B2
APPLICATION NO.   : 13/381447
DATED             : September 3, 2013
INVENTOR(S)       : Kazuhiro Yamamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 104 days.

Signed and Sealed this
Fifteenth Day of September, 2015

Michelle K. Lee
*Director of the United States Patent and Trademark Office*